(12) United States Patent
Maeda et al.

(10) Patent No.: US 8,428,303 B2
(45) Date of Patent: Apr. 23, 2013

(54) POSTAL INDICIUM DETECTION METHOD AND POSTAL INDICIUM DETECTION APPARATUS

(75) Inventors: Masaya Maeda, Kawasaki (JP); Bunpei Irie, Kawasaki (JP); Toshio Sato, Yokohama (JP); Naotake Natori, Kunitachi (JP); Tomoyuki Hamamura, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 288 days.

(21) Appl. No.: 12/875,943

(22) Filed: Sep. 3, 2010

(65) Prior Publication Data

US 2011/0091067 A1   Apr. 21, 2011

(30) Foreign Application Priority Data

Oct. 16, 2009   (JP) .................................. 2009-239505

(51) Int. Cl.
*G06K 9/00* (2006.01)
(52) U.S. Cl.
USPC .......................................... 382/101; 382/100
(58) Field of Classification Search .................. None
See application file for complete search history.

(56) References Cited

U.S. PATENT DOCUMENTS

| | | | | |
|---|---|---|---|---|
| 4,783,825 A | * | 11/1988 | Hirose et al. | 382/101 |
| 5,280,531 A | * | 1/1994 | Hunter | 382/101 |
| 5,535,127 A | * | 7/1996 | Uno et al. | 705/406 |
| 7,668,784 B2 | * | 2/2010 | Herbert | 705/62 |
| 7,920,296 B2 | * | 4/2011 | Beato et al. | 358/3.28 |
| 8,131,019 B2 | * | 3/2012 | Miller et al. | 382/107 |
| 2001/0021261 A1 | * | 9/2001 | Koga et al. | 382/101 |
| 2006/0044341 A1 | * | 3/2006 | Reichelsheimer et al. | 347/19 |
| 2008/0008376 A1 | | 1/2008 | Andel et al. | |

FOREIGN PATENT DOCUMENTS

| | | |
|---|---|---|
| EP | 1 569 178 A2 | 8/2005 |
| GB | 902 902 A | 8/1962 |
| JP | 08-180133 | 7/1996 |
| JP | 2000-524 | 1/2000 |
| JP | 2004-005051 | 1/2004 |
| JP | 2007-222746 | 9/2007 |

OTHER PUBLICATIONS

NPL—US Postal Postcard specification.*
Korean Office Action dated Mar. 5, 2012.
European Search Report dated Jul. 24, 2012.

* cited by examiner

*Primary Examiner* — Chan S Park
*Assistant Examiner* — Ha Le
(74) *Attorney, Agent, or Firm* — Pillsbury Winthrop Shaw Pittman, LLP

(57) ABSTRACT

According to one embodiment, a postal indicium detection method includes detecting whether or not one of a first face and a second face of a sheet corresponds to a picture card specific face, detecting a postal indicium candidate from the second face based on a first detection result indicating that the first face corresponds to the picture card specific face, and detecting the postal indicium candidate from the first face based on a second detection result indicating that the second face corresponds to the picture card specific face.

6 Claims, 8 Drawing Sheets

| Face specified | Address face | Direction specified | Direction | Detection target area |
|---|---|---|---|---|
| ○ | First face | ○ | Up | Area E1 |
| | | | Down | Area E2 |
| | | × | — | Areas E1 and E2 |
| | Second face | ○ | Up | Area E3 |
| | | | Down | Area E4 |
| | | × | — | Areas E3 and E4 |
| × | — | ○ | Up | Areas E1 and E3 |
| | | | Down | Areas E2 and E4 |
| | | × | — | Areas E1 to E4 |

FIG. 5

POSTAL INDICIUM DETECTION METHOD AND POSTAL INDICIUM DETECTION APPARATUS

CROSS-REFERENCE TO RELATED APPLICATIONS

This application is based upon and claims the benefit of priority from Japanese Patent Application No. 2009-239505, filed Oct. 16, 2009; the entire contents of which are incorporated herein by reference.

FIELD

Embodiments described herein relate generally to a postal indicium detection method and postal indicium detection apparatus, which detect postal indicia or stamp from sheets such as mail items.

BACKGROUND

In each postal sorting office, a mail processing apparatus is provided. The mail processing apparatus detects postal indicia such as stamps from mail items, and sorts faces and up-and-down directions of mail items based on the detection results of the postal indicia. For example, many stamps include afterglow components. The mail processing apparatus detects afterglow components from mail items and can detect stamps using the detection results of the afterglow components. The mail processing apparatus registers stamp images in advance, and can detect stamps from mail items based on the registered stamp images.

Mail items handled by the aforementioned mail processing often include picture cards. On a specific face of each picture card, a picture, photo, or pattern is printed. The aforementioned mail processing apparatus may often erroneously detect a part of the picture, photo, or pattern on the specific face of a picture card as a non-registered stamp having no afterglow component. Due to such detection errors of postal indicia, the mail processing apparatus cannot often normally sort picture cards. That is, such detection errors cause a sorting performance drop of the mail processing apparatus.

On the other hand, a mail processing apparatus which can efficiently recognize picture cards has been disclosed. For example, when a character string (e.g., "Printed in") unique to a picture card is detected from a mail item, this mail processing apparatus detects this mail item as a picture card.

Although the mail processing apparatus which can efficiently recognize picture cards has been disclosed, as described above, it is still difficult to prevent the aforementioned detection errors of postal indicia. That is, it is difficult to improve the sorting performance of mail items unless detection errors of postal indicia can be reduced.

BRIEF DESCRIPTION OF THE DRAWINGS

FIG. 5 shows an example of a postal indicium detection target area decision table;

DETAILED DESCRIPTION

In general, according to one embodiment, a postal indicium detection method includes detecting whether or not one of a first face and a second face of a sheet corresponds to a picture card specific face detecting a postal indicium candidate from the second face based on a first detection result indicating that the first face corresponds to the picture card specific face, and detecting the postal indicium candidate from the first face based on a second detection result indicating that the second face corresponds to the picture card specific face.

Figure 1:
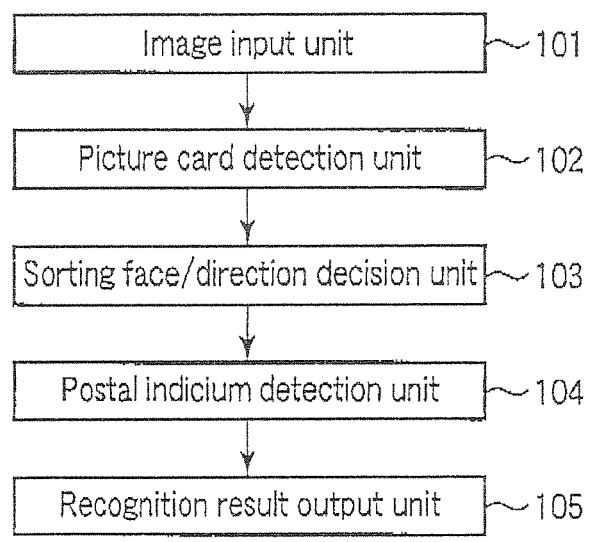
FIG. 1 is a schematic block diagram showing an example of the arrangement of a mail processing apparatus (postal indicium detection apparatus) according to a first embodiment.

FIG. 1 is a schematic block diagram showing the arrangement of a mail processing apparatus (postal indicium detection apparatus) according to a first embodiment. As shown in FIG. 1, the mail processing apparatus includes an image input unit 101, picture card detection unit 102, sorting face/direction decision unit 103, postal indicium detection unit 104, and recognition result output unit 105.

Figure 2:
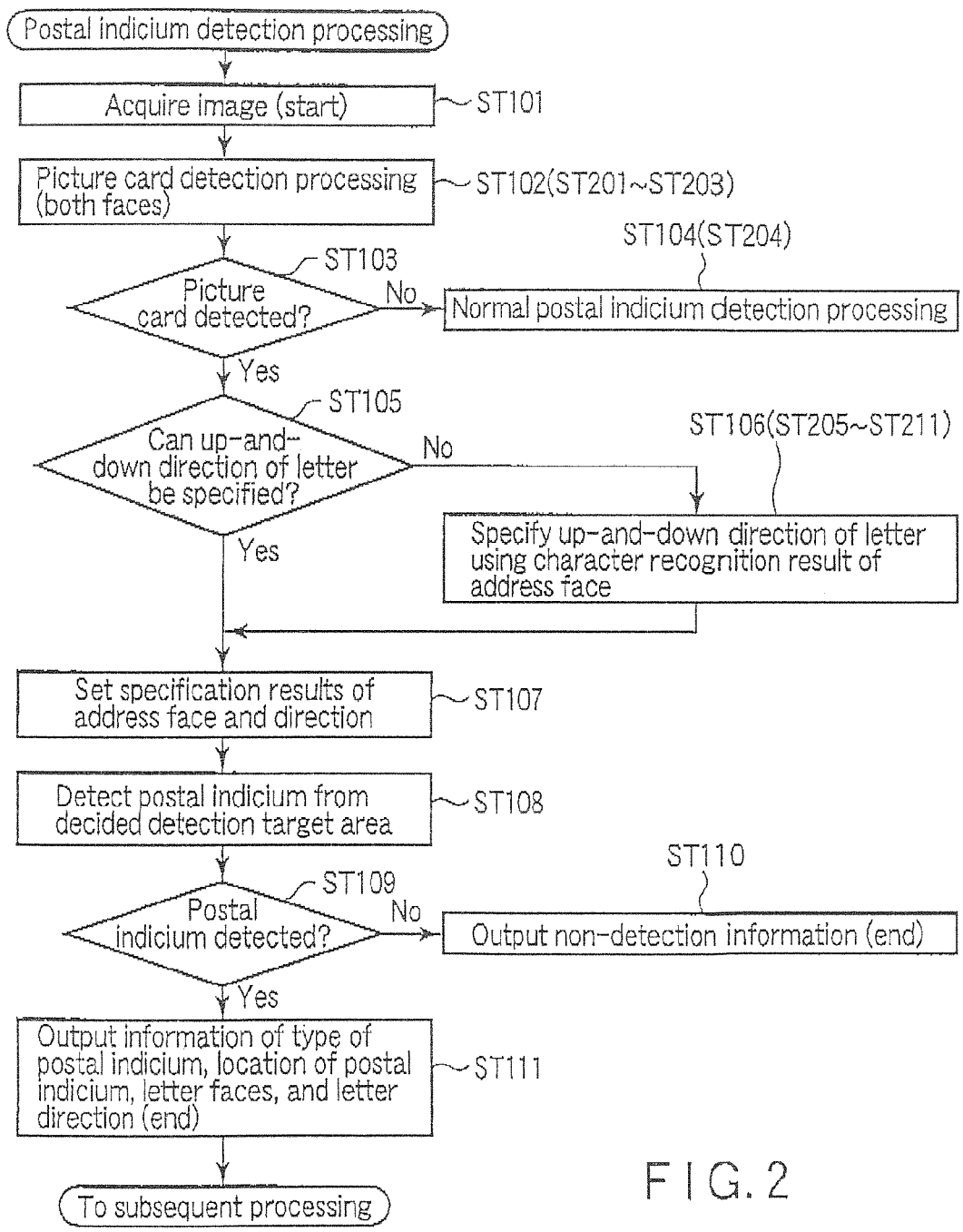
FIG. 2 is a flowchart for explaining an example of a basic operation of postal indicium detection processing by the mail processing apparatus according to the first embodiment.
Figure 4:
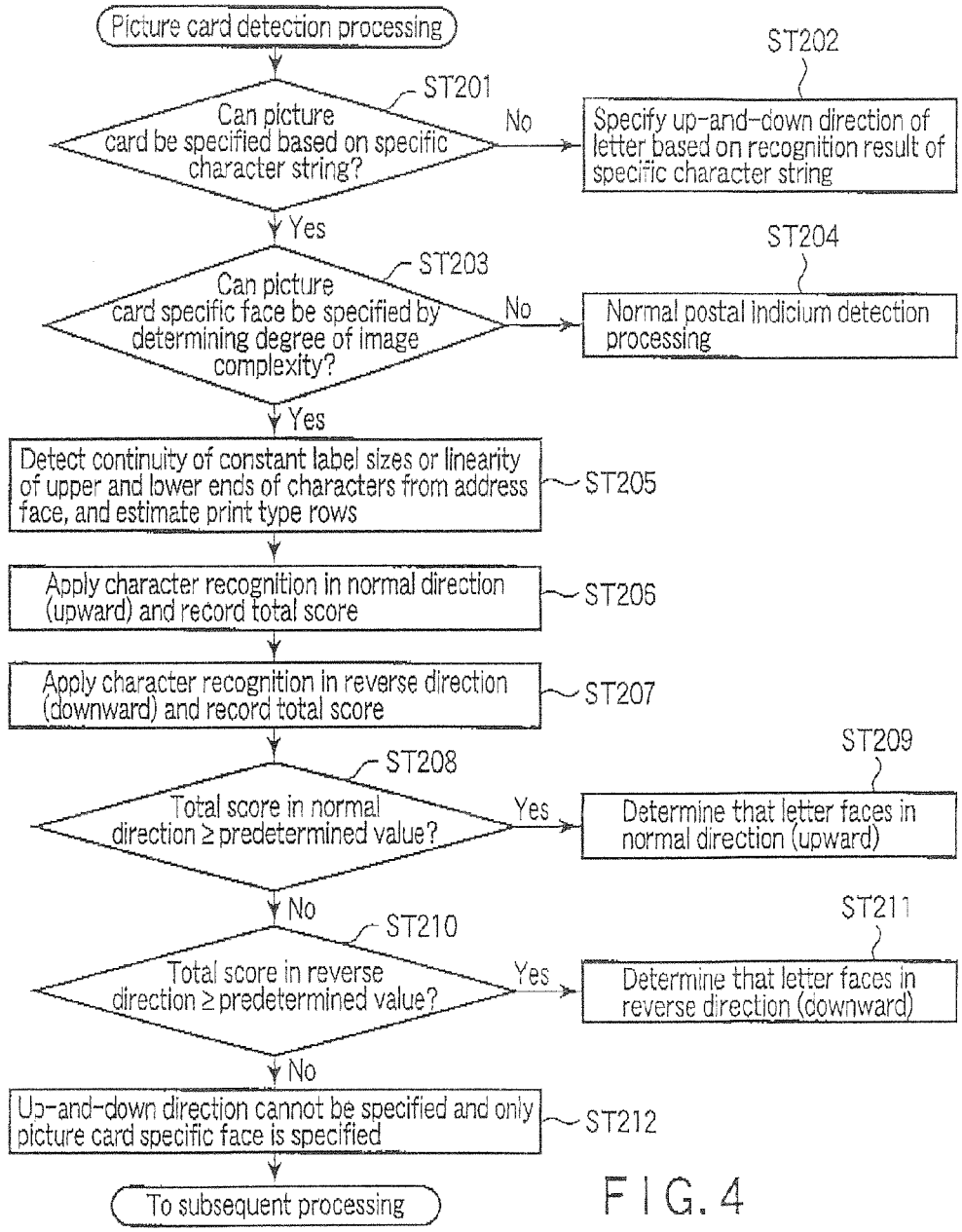
FIG. 4 is a flowchart showing an example of picture card detection processing.

FIG. 2 is a flowchart for explaining an example of a basic operation of postal indicium detection processing by the mail processing apparatus according to the first embodiment. A plurality of letters (mail items/sheets) are fed in turn to the image input unit 101. The image input unit 101 captures images of a first face (obverse face) and second face (reverse face) of each letter using a visible light scanner to acquire first image data (grayscale image data) from the first face of the letter and second image data (grayscale image data) also from the second face of the letter (ST101). For example, assume that the first image data includes the entire image of the first face of the letter, and the second image data includes the entire image of the second face of the letter The picture card detection unit 102 executes picture card detection processing for the first and second image data (ST102). FIG. 4 is a flowchart showing an example of the picture card detection processing. For example, if the picture card detection unit 102 can detect a specific character string from the first image data, it determines that the letter corresponds to a picture card (ST201). In this case, the picture card detection unit 102 determines the first face of the letter as an address face, and the second face as a picture card specific face. Likewise, if the picture card detection unit 102 can detect the specific character string from second image data, it determines that the letter corresponds to a picture card (ST201). In this case, the picture card detection unit 102 determines the second face of the letter as an address face, and the first face as a picture card specific face. Note that when the specific character string can be detected from the first image data, specific character string detection for the second image data may be skipped, or it may also be applied to the second image data to assure certainty.

Note that the picture card specific face is a face on which a picture, photo, or pattern is printed. The specific character string is, for example, "Printed in". On picture cards (address faces of picture cards), names of places of issuance such as "Printed in Tokyo" and "Printed in France" are often printed. In this case, an English expression "Printed in" has been exemplified, but expressions in other languages (for example, French and German) may be used in addition to English.

As described above, if the picture card detection unit 102 detects the specific character string from the first image data, and determines that the letter corresponds to a picture card (if it determines that the first face corresponds to an address face) (YES in ST201), the sorting face/direction decision unit 103 specifies an up-and-down direction of the letter (first face) based on the recognition result of the specific character string (an up-and-down direction of the specific character string) detected from the first image data (ST202). Likewise, if the picture card detection unit 102 detects the specific character string from the second image data, and determines that the letter corresponds to a picture card (if it determines that the second face corresponds to an address face) (YES in ST201), the sorting face/direction decision unit 103 specifies an up-and-down direction of the letter (second face) based on the recognition result of the specific character string (an up-and-down direction of the specific character string) detected from the second image data (ST202).

If the picture card detection unit 102 cannot specify a picture card based on the specific character string, it specifies a picture card (picture card specific face) based on a degree of image complexity. For example, the picture card detection unit 102 detects a degree of image complexity of the first image data, and detects based on the detection result of the image complexity whether or not the first face corresponding to the first image data corresponds to a picture card specific face. Likewise, the picture card detection unit 102 detects a degree of image complexity of the second image data, and detects based on the detection result of the image complexity whether or not the second face corresponding to the second image data corresponds to a picture card specific face. For example, when the degree of image complexity of the first image data exceeds a reference value, the picture card detection unit 102 determines that the first face corresponds to a picture card specific face. That is, the picture card detection unit 102 determines that the letter with this first face corresponds to a picture card. Likewise, when the degree of image complexity of the second image data exceeds the reference value, the picture card detection unit 102 determines that the second face corresponds to a picture card specific face. That is, the picture card detection unit 102 determines that the letter with this second face corresponds to a picture card. Note that when the degree of image complexity of the first image data exceeds the reference value, degree of image complexity detection for the second image data may be skipped, or it may also be applied to the second image data to assure certainty.

Note that the picture card detection unit 102 can totally detect whether or not the letter corresponds to a picture card or whether or not one of the first and second faces of the letter corresponds to a picture card specific face by combining the aforementioned degree of image complexity detection and specific character string detection. Furthermore, the precision of picture card detection can be improved by utilizing the fact that picture cards have a constant size.

Figure 3:
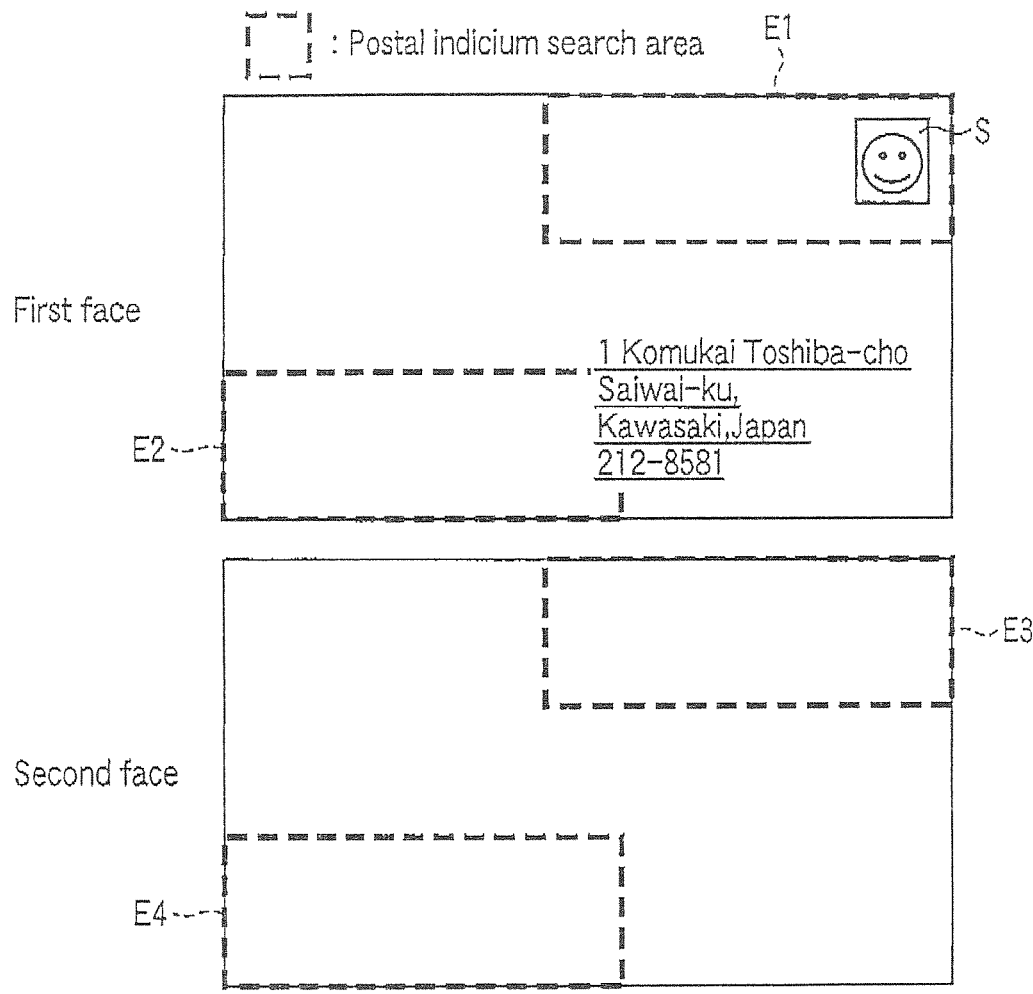
FIG. 3 is a view for explaining examples of areas on first and second faces of a letter to which postal indicium detection is applied.

If the picture card detection unit 102 cannot specify a picture card specific face (NO in ST203), the postal indicium detection unit 104 executes normal postal indicium detection processing for the first and second faces (ST204). For example, as shown in FIG. 3, the postal indicium detection unit 104 attempts postal indicium detection for areas E1 and E2 of the first face, and also for areas E3 and E4 of the second face, thus detecting a postal indicium (stamp S) from the postal indicium detection attempt results.

As described above, if the picture card detection unit 102 determines based on the degree of image complexity of the first image data that the first face corresponds to a picture card specific face (YES in ST203), the sorting face/direction decision unit 103 specifies the up-and-down direction of the second face based on address information which should be recorded on the second face (address face). If the picture card detection unit 102 determines based on the degree of image complexity of the second image data that the second face corresponds to a picture card specific face (YES in ST203), the sorting face/direction decision unit 103 specifies the up-and-down direction of the first face based on address information which should be recorded on the first face (address face).

For example, the sorting face/direction decision unit 103 detects, as labels, characters and the like that form address information which should be recorded on the second or first face, and detects continuity given label sizes as first information. Furthermore, the sorting face/direction decision unit 103 detects linearity of the upper or lower ends of characters that form address information which should be recorded on the second or first face as second information. The sorting face/direction decision unit 103 estimates print type rows (address information) from at least one of the first information and the second information (ST205).

Furthermore, the sorting face/direction decision unit 103 assumes a first direction of the print type rows as an up direction (normal direction), and executes character recognition of the print type rows in the normal direction. The unit 103 converts the character recognition results into scores, and records a total score (first total score) (ST206). Moreover, the sorting face/direction decision unit 103 assumes the first direction of the print type rows as a down direction (reverse direction), and executes character recognition of the print type rows in the reverse direction. The unit 103 converts the character recognition results into scores, and records a total score (second total score) (ST207).

If the first total score is equal to or larger than a reference value (YES in ST208), the sorting face/direction decision unit 103 determines the first direction of the print type rows as the up direction (normal direction) (ST209); if the second total so is equal to or larger than the reference value (YES in ST210), it determines the first direction of the print type rows as the down direction (reverse direction) (ST211). If both the first and second total scores are less than the reference value, the sorting face/direction decision unit 103 determines that a direction cannot be specified (ST212). Note that in this case, the picture card specific face has been specified by the aforementioned processing (ST212).

This embodiment will explain a case in which the picture card detection unit 102 detects using at least one of the aforementioned degree of image complexity detection and specific character string detection whether or not the letter corresponds to a picture card or whether or not one of the first and second faces of the letter corresponds to a picture card specific face. However, the picture card detection unit 102 may detect using other methods whether or not the letter corresponds to a picture card or whether or not one of the first and second faces of the letter corresponds to a picture card specific face.

Referring back to the flowchart in FIG. 2, the description will be continued. If the picture card detection unit 102 cannot specify the letter as a picture card (NO in ST103), the postal indicium detection unit 104 executes normal postal indicium detection processing for the first and second faces (ST104). If the picture card detection unit 102 determines the letter as a picture card (YES in ST103) but the up-end-down direction of the letter cannot be specified (NO in ST105), for example, if the picture card detection unit 102 specifies the letter as a picture card based on the degree of image complexity (YES in ST203), since the up-and-down direction of the letter cannot be specified, the sorting face/direction decision unit 103 specifies the up-and-down direction of the address face based on address information which should be recorded on the address face (ST106).

The sorting face/direction decision unit 103 sets the specification results of the up-and-down direction of the address face and letter (ST107), and decides a postal indicium detection target area with reference to a postal indicium detection target area decision table shown in FIG. 5. For example, when the first face is specified as an address face, the up-and-down direction of the letter is specified, and the letter is conveyed with the first face facing in the normal direction (up direction), area E1 shown in FIG. 3 is decided as the postal indicium detection target area. When the first face is specified as an address face, the up-and-down direction of the letter is specified, and the letter is conveyed with the first face facing in the reverse direction (down direction), area E2 shown in FIG. 3 is decided as the postal indicium detection target area. When the first face is specified as an address face, and the up-and-down direction of the letter is not specified, areas E1 and E2 shown in FIG. 3 are decided as the postal indicium detection target areas.

When the second face is specified as an address face, the up-and-down direction of the letter is specified, and the letter is conveyed with the second face facing in the normal direction (up direction), area E3 shown in FIG. 3 is decided as the postal indicium detection target area. When the second face is specified as an address face, the up-and-down direction of the letter is specified, and the letter is conveyed with the second face facing in the reverse direction (down direction), area E4 shown in FIG. 3 is decided as the postal indicium detection target area. When the second face is specified as an address face, and the up-and-down direction of the letter is not specified, areas E3 and E4 shown in FIG. 3 are decided as the postal indicium detection target areas.

When an address face is not specified, the up-and-down direction of the letter is specified, and the letter is conveyed in the normal direction (up direction), areas E1 and E3 shown in FIG. 3 are decided as the postal indicium detection target areas. When an address face is not specified, the up-and-down direction of the letter is specified, and the letter is conveyed in the reverse direction (down direction), areas E2 and E4 shown in FIG. 3 are decided as the postal indicium detection target areas. When an address face is not specified, and the up-and-down direction of the letter is not specified, areas E1 to E4 shown in FIG. 3 are decided as the postal indicium detection target areas.

Note that the postal indicium detection target area decision table shown in FIG. 5 is provided for an exemplary purpose only, and appropriate decision tables are used according to languages described on letters or the custom of the positions of postal indicia.

The postal indicium detection unit 104 detects a postal indicium from the decided detection target area or areas (ST108). For example, the postal indicium detection unit 104 registers postal indicium images in advance, and compares a postal indicium candidate image detected from the decided detection target area with the registered postal indicium images, thereby detecting a postal indicium from the decided detection target area. If a postal indicium cannot be detected (NO in ST105), the postal indicium detection unit 104 outputs postal indicium non-detection information (ST110). If a postal indicium can be detected (YES in ST109), the postal indicium detection unit 104 outputs information of a type of the detected postal indicium, a location of the postal indicium, letter faces (positions of an address face and picture card specific dace), and a letter direction.

Figure 6:
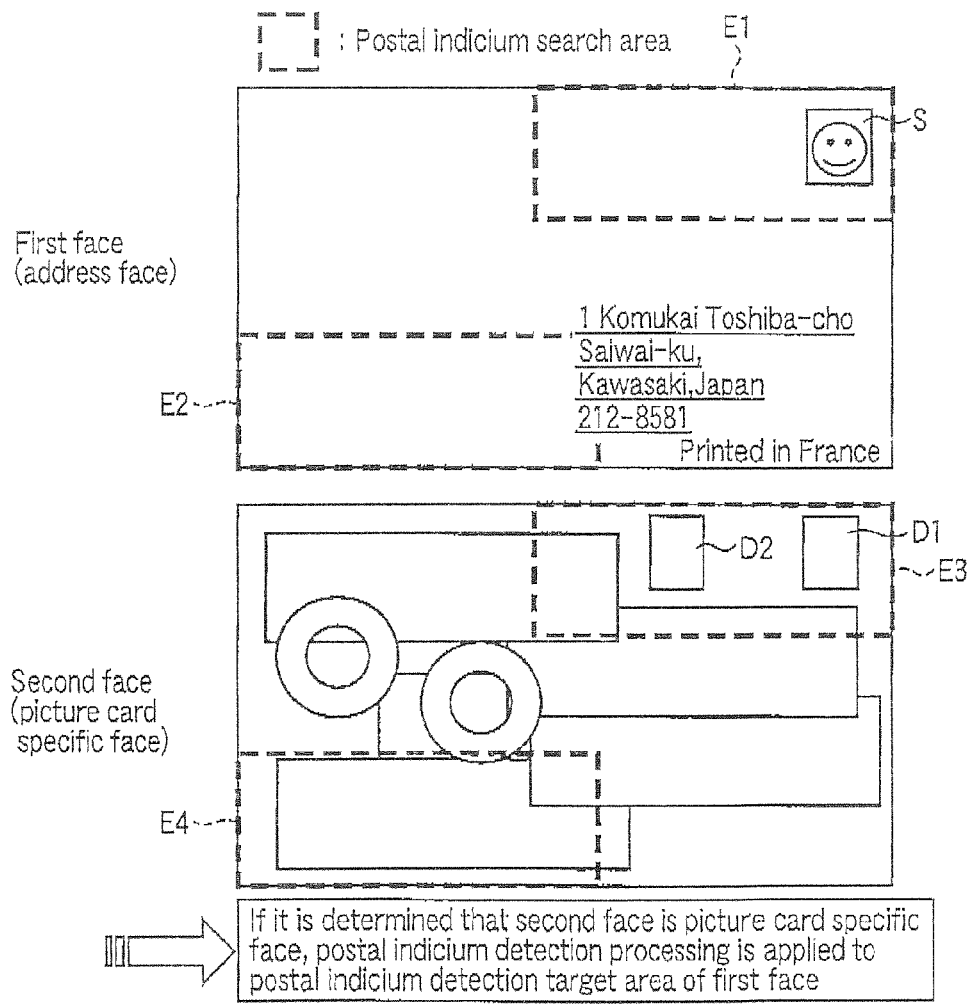
FIG. 6 is a view showing examples of areas on a first face (address face) and second face (picture card specific face) of a letter to which postal indicium detection is applied.

As described above, when the mail processing apparatus detects the specific character string from the first face of a letter, it estimates that the second face is a picture card specific face, and executes postal indicium detection processing for the first face without executing it for the second face. In this manner, a picture, photo, or pattern on the picture card specific face can be prevented from being erroneously detected as a postal indicium. For example, as shown in FIG. 6, even when a picture card specific face includes patterns D1 and D2 approximate to actual postal indicia, these patterns D1 and D2 can be prevented from being erroneously detected as postal indicia. Furthermore, even when these patterns D1 and D2 are images similar to actual postal indicia, they can be prevented from being erroneously detected as postal indicia. In addition, since the mail processing apparatus can specify an up-and-down direction of a letter (first face) from the detected specific character string, it can further focus postal indicium detection target areas, thus speeding up the postal indicium detection and improving certainty.

Likewise, when the mail processing apparatus detects the specific character string from the second face of a letter, it estimates that the first face is a picture card specific face, and executes postal indicium detection processing for the second face without executing it for the first face. In this manner, a picture, photo, or pattern on the picture card specific face can be prevented from being erroneously detected as a postal indicium. In addition, since the mail processing apparatus can specify an up-and-down direction of a letter (second face) from the detected specific character string, it can further focus postal indicium detection target areas, thus speeding up the postal indicium detection and improving certainty.

When the mail processing apparatus detects the first face as a picture card specific face based on the degree of image complexity, it executes postal indicium detection processing for the second face without executing it for the first face. In this manner, a picture, photo, or pattern on the picture card specific face can be prevented from being erroneously detected as a postal indicium. In addition, since the mail processing apparatus can specify an up-and-down direction of a letter (second face) from the character recognition result of the second face, it can further focus postal indicium detection target areas, thus speeding up the postal indicium detection and improving certainty.

Likewise, when the mail processing apparatus detects the second face as a picture card specific face based on the degree of image complexity, it executes postal indicium detection processing for the first face without executing it for the second face. In this manner, a picture, photo, or pattern on the picture card specific face can be prevented from being erroneously detected as a postal indicium. In addition, since the mail processing apparatus can specify an up-and-down direction of a letter (first face) from the character recognition result of the first face, it can further focus postal indicium detection target areas, thus speeding up the postal indicium detection and improving certainty.

Note that the mail processing apparatus detects a postal indicium from a focused postal indicium detection target area, as described above. Hence, a threshold for the postal indicium detection may be dynamically changed. For example, the normal postal indicium detection processing may set a first threshold as that for the postal indicium detection to roughly detect a postal indicium. On the other hand, the postal indicium detection processing using the picture card detection may set a second threshold higher than the first threshold as that for the postal indicium detection so as to severely detect a postal indicium.

Note that FIG. 6 assumes a picture card commonly used in English mail items. However, the mail processing apparatus of this embodiment may assume a picture card commonly used in Japanese mail items to prevent detection errors of postal indicia.

Note that detection processing using similarities of images or feature vectors or that of a rectangle or circle by means of Hough transformation may be applied to the postal indicium detection processing.

Figure 7:
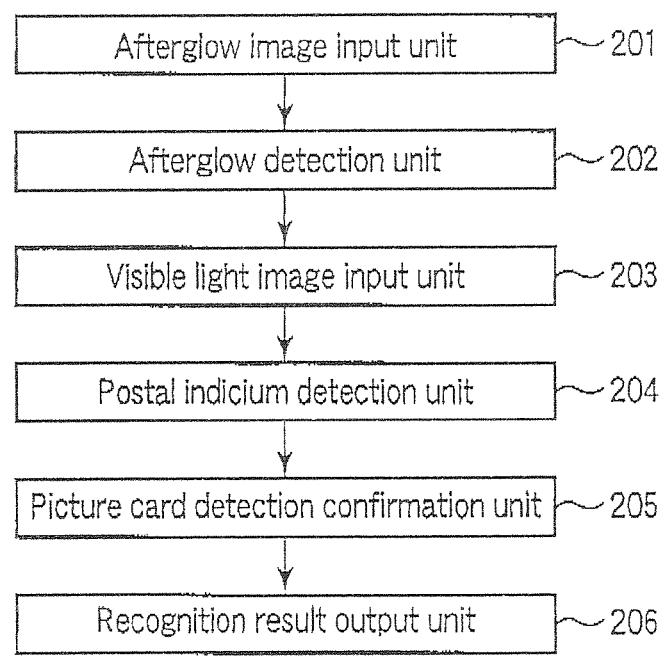
FIG. 7 is a schematic block diagram showing an example of the arrangement of a mail processing apparatus (postal indicium detection apparatus) according to a second embodiment.

Mail processing according to the second embodiment will be described below. A description of contents common to the aforementioned first embodiment will not be repeated. FIG. 7 is a schematic block diagram showing the arrangement of a mail processing apparatus (postal indicium detection apparatus) according to the second embodiment. As shown in FIG. 7, the mail processing apparatus includes an afterglow image input unit 201, afterglow detection unit 202, visible light image input unit 203, postal indicium detection unit 204, picture card detection confirmation unit 205, and recognition result output unit 206.

Figure 8:
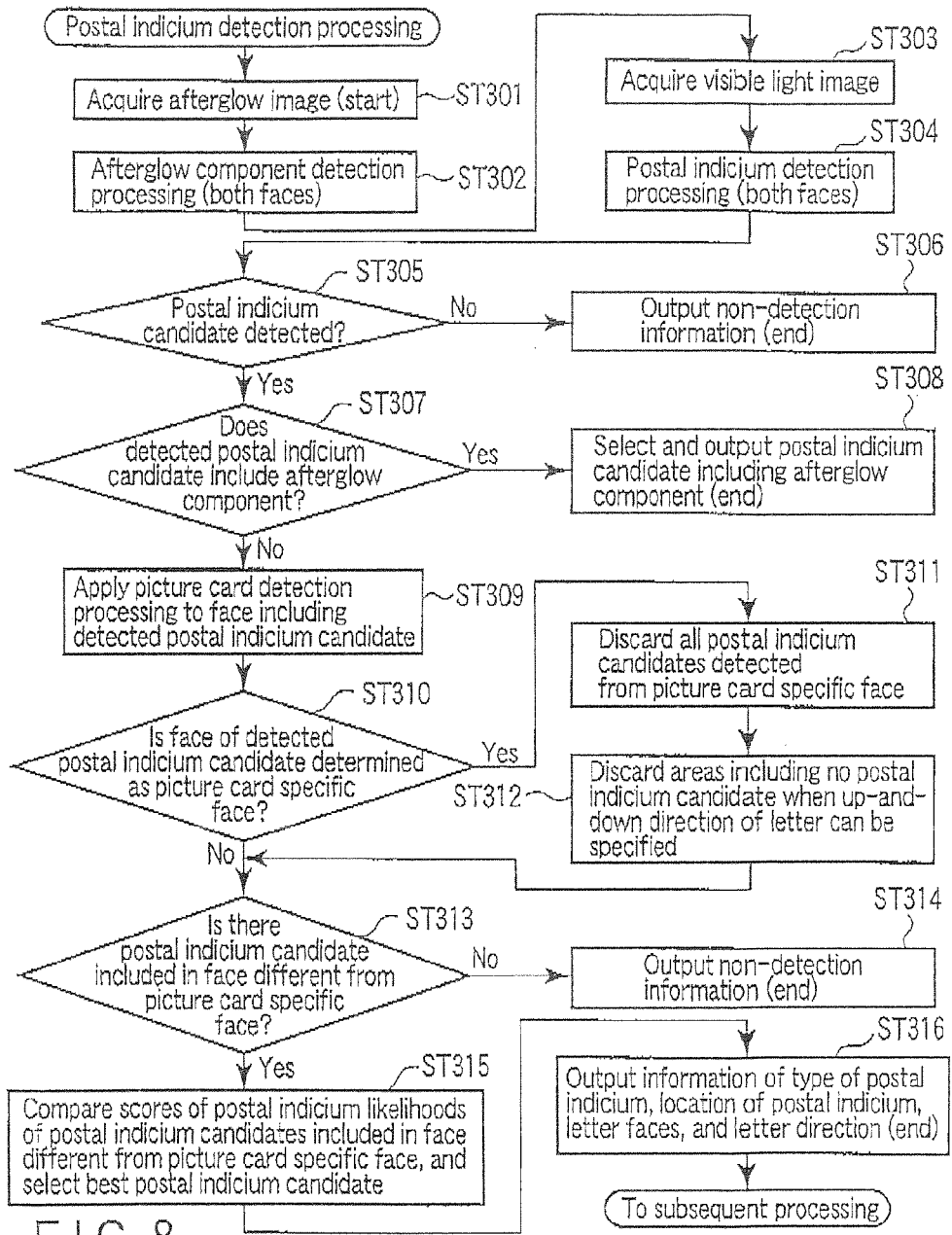
FIG. 8 is a flowchart for explaining an example of a basic operation of postal indicium detection processing by the mail processing apparatus according to the second embodiment.

FIG. 8 is a flowchart for explaining an example of a basic operation of postal indicium detection processing by the mail processing apparatus according to the second embodiment. A plurality of letters (mail items/sheets) are fed in turn the afterglow image input unit 201. The afterglow image input unit 201 captures images of a first face (obverse face) and second face (reverse face) of each letter using an afterglow scanner to acquire first image data from the first face of the letter and second image data also from the second face of the letter (ST301). The afterglow detection unit 202 detects afterglow components (that of, e.g., a stamp) from the first and second image data (ST302). For example, after a plurality of afterglow components are detected from the first and second image data by differential labeling processing, an appropriate afterglow component is detected as that obtained from, e.g., a stamp. For example, a size of an afterglow component corresponding to that of, e.g., a stamp is registered in advance, and an afterglow component which corresponds to the registered size of the afterglow component (to be referred to as a corresponding afterglow component) is selected from the plurality of afterglow components. Furthermore, noise components included in the corresponding afterglow component are removed.

Then, the visible light image input unit 203 captures images of the first face (obverse face) and second face (reverse face) of the letter using a visible light scanner to acquire third image data from the first face of the letter and also fourth image data from the second face of the letter (ST303).

Note that the image input processing by the visible light image input unit 203 may be preferentially applied to the letter from which the afterglow component is detected.

The postal indicium detection unit 204 then applies postal indicium detection processing to the third image data and also to the fourth image data (ST304). If the postal indicium detection unit 204 cannot detect any postal indicium candidates by the postal indicium detection processing (NO in ST305), it outputs postal indicium non-detection information (ST306). If the postal indicium detection unit 204 can detect one or more postal indicium candidates by the postal indicium detection processing (YES in ST305), and if the detected postal indicium candidates include a postal indicium candidate including the corresponding afterglow component (YES in ST307), the postal indicium candidate including the corresponding afterglow component is selected as a postal indicium (ST308). In this case, since a postal indicium is likely to be correctly detected, the postal indicium detection processing ends without executing postal indicium detection error verification processing (to be described later). In this manner, the high-speed postal indicium detection processing can be maintained.

Note that when the corresponding afterglow component is detected, a postal indicium location can be estimated from the detection result of the corresponding afterglow component if no postal indicium candidate is detected.

If the detected postal indicium candidates do not include any postal indicium candidate including the corresponding afterglow component (NO in ST307), since a postal indicium is unlikely to be correctly detected, postal indicium detection error verification processing (to be described later) is executed.

The picture card detection confirmation unit 205 detects whether or not the face of the detected postal indicium candidate corresponds to a sheet specific face (ST309). As described in the first embodiment, the picture card detection confirmation unit 205 detects based on a specific character string detection result whether or not the face of the detected postal indicium candidate corresponds to a sheet specific surface. If a specific character string is detected from the face of the detected postal indicium candidate, it is determined that the face of the detected postal indicium candidate corresponds to a sheet specific surface. Alternatively, as described in the first embodiment, the picture card detection confirmation unit 205 detects based on a degree of image complex not the face of the detected postal indicium candidate corresponds to a sheet specific surface. If the degree of image complexity of the face of the detected postal indicium candidate exceeds a reference value, it is determined that the face of the detected postal indicium candidate corresponds to a picture card specific surface.

If the postal indicium candidate is included in a picture card specific face (YES in ST310), the recognition result output unit 206 discards the postal indicium candidate included in the picture card specific face (ST311). That is, the postal indicium candidate, which is likely to be erroneously detected, is discarded. In this manner, detection errors of postal indicia can be prevented. Also, as described in the first embodiment, when an up-and-down direction letter is specified, areas which do not include any postal indicium are also discarded according to the contents of the first embodiment (ST312).

If there is no postal indicium candidate included in a face different from the picture card specific face (NO in ST313), the recognition result output unit 206 outputs postal indicium non-detection information (ST314). In this way, detection errors of postal indicia can be prevented even when no postal indicium is detected. Detection errors of postal indicia cause sorting error and seal errors of letters. If such errors have occurred, heavy load is imposed on workers. That is, prevention of detection errors of postal indicia mean much even when postal indicia cannot be detected.

If there are a plurality of postal indicium candidates included in a face different from the picture card specific face (YES in ST313), the recognition result output unit 206 compares scores of postal indicium likelihoods of these plurality of postal indicium candidates, and selects a postal indicium candidate closest to a postal indicium (ST315). Then, the recognition result output unit 206 determines the selected postal indicium candidate as a postal indicium, and outputs information of a type of this postal indicium, a location of the postal indicium, letter faces (positions of an address face and picture card specific face), and letter direction (ST316).

Note that when the scores of the postal indicium candidates are less than a reference score, the recognition result output unit 206 outputs postal indicium non-detection information.

As described above, the mail processing apparatus can confirm correctness of the detected postal indicium candidate, and can consequently prevent detection errors of postal indicia. In addition, when it is detected that a postal indicium is likely to be correctly detected, the mail processing apparatus en the postal indicium detection processing without executing the subsequent postal indicium detection error verification processing. In this manner, the high-speed postal indicium detection processing can be maintained.

The mail processing apparatus can prevent a part of a picture, photo, or pattern on a specific face of a picture card from being detected as a postal indicium including no afterglow component. Since detection errors of postal indicia are prevented, a sorting performance drop of the mail processing apparatus can be further prevented. Since the mail processing apparatus can focus postal indicium detection target areas by the picture card detection processing, the letter processing speed can be improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A postal indicium detection method comprising:
   detecting whether or not one of a first face and a second face of a sheet corresponds to a picture card specific face; and
   detecting a character direction of the second face based on a first detection result indicating that the first face corresponds to the picture card specific face, estimating a first or second postal indicium detection target area of the second face based on a character direction detection successful result of the second face, and detecting the postal indicium candidate from the first or second postal indicium detection target area of the second face;
   detecting the character direction of the second face based on the first detection result, estimating the first and second postal indicium detection target areas of the second face based on a character direction detection error result of the second face, and detecting the postal indicium candidate from the first and second postal indicium detection target areas of the second face;
   detecting a character direction of the first face based on the second detection result indicating that the second face corresponds to the picture card specific face, estimating a third or fourth postal indicium detection target area of the first face based on a character direction detection successful result of the first face, and detecting the postal indicium candidate from the third or fourth postal indicium detection target area of the first face; and
   detecting the character direction of the first face based on the second detection result, estimating the third and fourth postal indicium detection target areas of the first face based on a character direction detection error result of the first face, and detecting the postal indicium candidate from the third and fourth postal indicium detection target area of the first face.

2. The method of claim 1, further comprising:
   detecting based on a degree of complexity of an image of at least one of the first face and the second face whether or not one of the first face and the second face corresponds to the picture card specific face.

3. The method of claim 1, further comprising:
   detecting based on a specific character string detection result of at least one of the first face and the second face whether or not one of the first face and the second face corresponds to the picture card specific face.

4. A postal indicium detection method comprising:
   detecting, when a postal indicium candidate is detected from a first face of a sheet, whether or not the first face corresponds to a picture card specific face, and determining based on a first detection result indicating that the first face corresponds to the picture card specific face that the postal indicium candidate is likely to be erroneously detected;
   detecting a character direction of the second face based on the first detection result, estimating a first or second postal indicium detection target area of the second face based on a character direction detection successful result of the second face, and detecting the postal indicium candidate from the first or second postal indicium detection target area of the second face;
   detecting the character direction of the second face based on the first detection result, estimating the first and second postal indicium detection target areas of the second face based on a character direction detection error result of the second face, and detecting the postal indicium candidate from the first and second postal indicium detection target areas of the second face;
   detecting, when the postal indicium candidate is detected from a second face of the sheet, whether or not the second face corresponds to the picture card specific face, and determining based on a second detection result indicating that the second face corresponds to the picture card specific face that the postal indicium candidate is likely to be erroneously detected
   detecting a character direction of the first face based on the second detection result indicating that the second face corresponds to the picture card specific face, estimating a third or fourth postal indicium detection target area of the first face based on a character direction detection successful result of the first face, and detecting the postal indicium candidate from the third or fourth postal indicium detection target area of the first face; and
   detecting the character direction of the first face based on the second detection result, estimating the third and fourth postal indicium detection target areas of the first face based on a character direction detection error result of the first face, and detecting the postal indicium candidate from the third and fourth postal indicium detection target area of the first face.

5. The method of claim 4, further comprising:
   detecting, when the postal indicium candidate including no afterglow component is detected from the first face, whether or not the first face corresponds to the picture card specific face, and determining based on the first detection result that the postal indicium candidate is likely to be erroneously detected; and
   detecting, when the postal indicium candidate including no afterglow component is detected from the second face, whether or not the second face corresponds to the picture card specific face, and determining based on the second detection result that the postal indicium candidate is likely to be erroneously detected.

6. A postal indicium detection apparatus comprising:

a first detector configured to detect whether or not one of a first face and a second face of a sheet corresponds to a picture card specific face; and a second detector configured to detect a postal indicium candidate from the second face based on a first detection result indicating that the first face corresponds to the picture card specific face, and to detect the postal indicium candidate from the first face based on a second detection result indicating that the second face corresponds to the picture card specific face, wherein the second detector detects a character direction of the second face based on a first detection result indicating that the first face corresponds to the picture card specific face, estimates a first or second postal indicium detection target area of the second face based on a character direction detection successful result of the second face, and detects the postal indicium candidate from the first or second postal indicium detection target area of the second face;

the second detector detects the character direction of the second face based on the first detection result, estimates the first and second postal indicium detection target areas of the second face based on a character direction detection error result of the second face, and detects the postal indicium candidate from the first and second postal indicium detection target areas of the second face;

the second detector detects a character direction of the first face based on the second detection result indicating that the second face corresponds to the picture card specific face, estimates a third or fourth postal indicium detection target area of the first face based on a character direction detection successful result of the first face, and detects the postal indicium candidate from the third or fourth postal indicium detection target area of the first face; and the second detector detects the character direction of the first face based on the second detection result, estimates the third and fourth postal indicium detection target areas of the first face based on a character direction detection error result of the first face, and detects the postal indicium candidate from the third and fourth postal indicium detection target area of the first face.

\* \* \* \* \*